US006644461B1

(12) United States Patent

Imbert et al.

(10) Patent No.: US 6,644,461 B1

(45) Date of Patent: Nov. 11, 2003

(54) DEVICE FOR TRANSFERRING FLAT OBJECTS WITH AN INJECTOR COMPRISING ELASTICALLY DEFORMABLE WHEELS

(75) Inventors: Denis Imbert, Manosque (FR); Robert Vivant, Chabeuil (FR); Francois Chaume, Saint Marcel les Valence (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 10/009,901

(22) PCT Filed: Jun. 21, 2000

(86) PCT No.: PCT/EP00/05702

§ 371 (c)(1), (2), (4) Date: Jun. 3, 2002

(87) PCT Pub. No.: WO00/78471

PCT Pub. Date: Dec. 28, 2000

(30) Foreign Application Priority Data

Jun. 22, 1999 (FR) ........................................... 99 07932

(51) Int. Cl.$^{7}$ ............................................... B65G 47/26

(52) U.S. Cl. ............................... 198/419.2; 198/419.3; 198/418.7; 198/431; 198/460.1; 198/461.1; 198/464.2; 198/464.3

(58) Field of Search ........................... 198/419.2, 419.3, 198/418.7, 431, 460.1, 461.1, 464.2, 464.3

(56) References Cited

U.S. PATENT DOCUMENTS

| | | | | | |
|---|---|---|---|---|---|
| 3,651,985 | A | * | 3/1972 | Smith | 221/10 |
| 4,210,237 | A | * | 7/1980 | Gram | 198/425 |
| 4,768,642 | A | * | 9/1988 | Hunter | 198/425 |
| 4,991,708 | A | * | 2/1991 | Francioni | 198/419.2 |
| 5,038,915 | A | * | 8/1991 | Delsanto | 198/419.3 |
| 5,054,763 | A | * | 10/1991 | Achelpohl et al. | 217/182 |
| 5,551,550 | A | * | 9/1996 | Marshall et al. | 198/432 |
| 5,653,328 | A | * | 8/1997 | Pedrotto | 198/418.1 |
| 5,775,067 | A | * | 7/1998 | Hawley | 53/543 |
| 5,826,637 | A | * | 10/1998 | Newnes et al. | 144/382 |
| 5,979,636 | A | * | 11/1999 | Vanacore et al. | 198/460.1 |
| 6,019,213 | A | * | 2/2000 | Schubert | 198/419.3 |
| 6,131,372 | A | * | 10/2000 | Pruett | 53/448 |
| 6,253,904 | B1 | * | 7/2001 | Soldavini | 198/431 |
| 6,286,290 | B1 | * | 9/2001 | Fluck | 53/54 |
| 6,292,710 | B1 | * | 9/2001 | Bonnet | 700/230 |
| 6,308,817 | B1 | * | 10/2001 | Corniani et al. | 198/419.3 |

* cited by examiner

*Primary Examiner*—Christopher P. Ellis
*Assistant Examiner*—Rashmi Sharma
(74) *Attorney, Agent, or Firm*—Pitney, Hardin, Kipp & Szuch LLP

(57) ABSTRACT

The device for individually transferring flat objects from an entry conveyor (2) on which the objects travel in series edge-on in a first direction (A), into buckets (6) of an exit conveyor (5), comprises an intermediate conveyor (7) arranged in the continuation of the entry conveyor above the exit conveyor and equipped with receptacles (9) which, over at least part of their path, can move in a second direction (B) perpendicular to said first direction, each flat object leaving the entry conveyor being injected edge-on into a receptacle of the intermediate conveyor which comes up to face the exit of the entry conveyor so as to be transferred edge-on into a bucket of the exit conveyor. It further comprises an injection system (14) comprising elastically deformable wheels (15) at the exit end of the entry conveyor and designed to accelerate and then retard the movement of each flat object in said first direction before injecting it into a receptacle of the intermediate conveyor.

4 Claims, 3 Drawing Sheets

DEVICE FOR TRANSFERRING FLAT OBJECTS WITH AN INJECTOR COMPRISING ELASTICALLY DEFORMABLE WHEELS

BACKGROUND OF THE INVENTION

The invention relates to a device for individually transferring flat objects from an entry conveyor on which said objects travel in series edge-on in a first direction, into buckets of an exit conveyor, the device comprising an intermediate conveyor arranged in the continuation of the entry conveyor above the exit conveyor and equipped with receptacles which, over at least part of their path, can move in a second direction perpendicular to said first direction, each flat object leaving the entry conveyor being injected edge-on into a receptacle of the intermediate conveyor which comes up to face the exit of the entry conveyor so as to be transferred edge-on into a bucket of the exit conveyor.

A device of this kind is more specifically intended for a postal sorting machine and is already known from patent document EP-0608161. In this known device, the entry conveyor comprises two motorized belts moved at constant speed and between which the envelopes, arranged edge-on and in series, are gripped, and each envelope leaving the entry conveyor is injected directly edge-on into a receptacle of the intermediate conveyor. The speed at which the envelopes are ejected at exit from the entry conveyor is about 3 meters per second. Given this high speed level, the envelopes injected into the receptacles of the intermediate conveyor violently strike the bottom of these receptacles, which means they may become damaged under the effect of the impact.

The purpose of the invention is to overcome this drawback.

SUMMARY OF THE INVENTION

To this end, the subject of the invention is a transfer device as defined hereinabove, wherein an injection system is disposed at the exit end of the entry conveyor and designed to accelerate and then retard the movement of each flat object in said first direction before injecting it into a receptacle of the intermediate convey by using an injection system, as known from the patent document EP 0574710, which is designed to accelerate and after decelerate a product between the end of a feed conveyor and a distribution point of the product. With this arrangement, the flat objects can be injected into the receptables of the intermediate conveyor at a lower speed by comparison with the speed at which they exit the entry conveyor, thus making it possible to reduce the violence of the impact.

The injection system comprising two parallel rows of several elastically deformable elastomer wheels with stationary rotation spindles, between which wheels each flat object is gripped, these two rows of wheels comprising wheels arranged on the same side as the entry conveyor and rotated at constant speed with the possibility of being placed freely at overspeed and wheels arranged on the same side as the intermediate conveyor, which are rotated at variable speed. Each flat object moved in the entry conveyor at a certain speed is taken up firstly by the wheels rotated at a constant speed that corresponds to the speed at which the flat object moves as it leaves the entry conveyor. As soon as the flat object is released from the entry conveyor, the wheels rotated at variable speed take up this flat object and can accelerate its movement to be able to inject it into a receptacle of the entry conveyor having retarded its movement. Because the wheels rotated at constant speed can be freely set to an overspeed (that is to say a freewheel effect), they do not oppose the accelerating of the movement of the flat object between the two rows of wheels. It must be understood that the phase of retarding the movement of the flat object has to coincide with the instant when the flat object is no longer gripped between the wheels which are rotated at constant speed.

According to yet another particular embodiment of the device according to the invention, a means is provided for determining the length of each flat object in said first direction and the speed of rotation of the wheels driven at variable speed is regulated according to said length determination, which makes it possible to broaden the range of flat objects that can be transferred to the buckets of the exit conveyor.

According to yet another embodiment of the device according to the invention, each wheel comprises a hub and an annular tread strip made of elastomer which are connected together by elastomer circular-arc-shaped fins, the points of attachment of each fin to the hub and to the tread strip of the wheel being aligned on a radius of the wheel which makes it possible to make the elastomer work over the entire length of the fins without creating any stress concentration zones. Such wheels are well suited to tolerating significant variations in thickness of the flat objects. They have far better positional-return dynamics than simple pulleys mounted on pivoting arms returned by springs. Because they are mounted on stationary rotation spindles, the structure of the transfer device is simplified and requires little maintenance.

According to yet another embodiment of the device according to the invention, the receptacles of the intermediate conveyor are grooves which run in a third direction perpendicular to the first and second directions and a flat support is provided in the continuation of the entry conveyor between the intermediate conveyor and the exit conveyor so that a flat object injected into a groove of the intermediate conveyor is kept edge-on and moved along standing on its edge in said second direction as far as one end of said flat support to then fall under gravity into a bucket of the exit conveyor. This flat support may be a stationary plate or may alternatively be a motorized endless belt. This arrangement plays a part in simplifying the structure of the intermediate conveyor by avoiding providing receptacles with a mobile flap. Using this arrangement, each flat object injected into a groove of the intermediate conveyor can be positioned correctly edge-on in an inclined position before dropping under gravity into a bucket of the exit conveyor, thus making it possible to obtain good positioning of the flat object edge-on in the bucket.

BRIEF DESCRIPTION OF THE DRAWINGS

One embodiment of a transfer device according to the invention is described hereinafter in detail and is illustrated in the drawings.

DETAILED DESCRIPTION OF THE INVENTION

Figure 1:
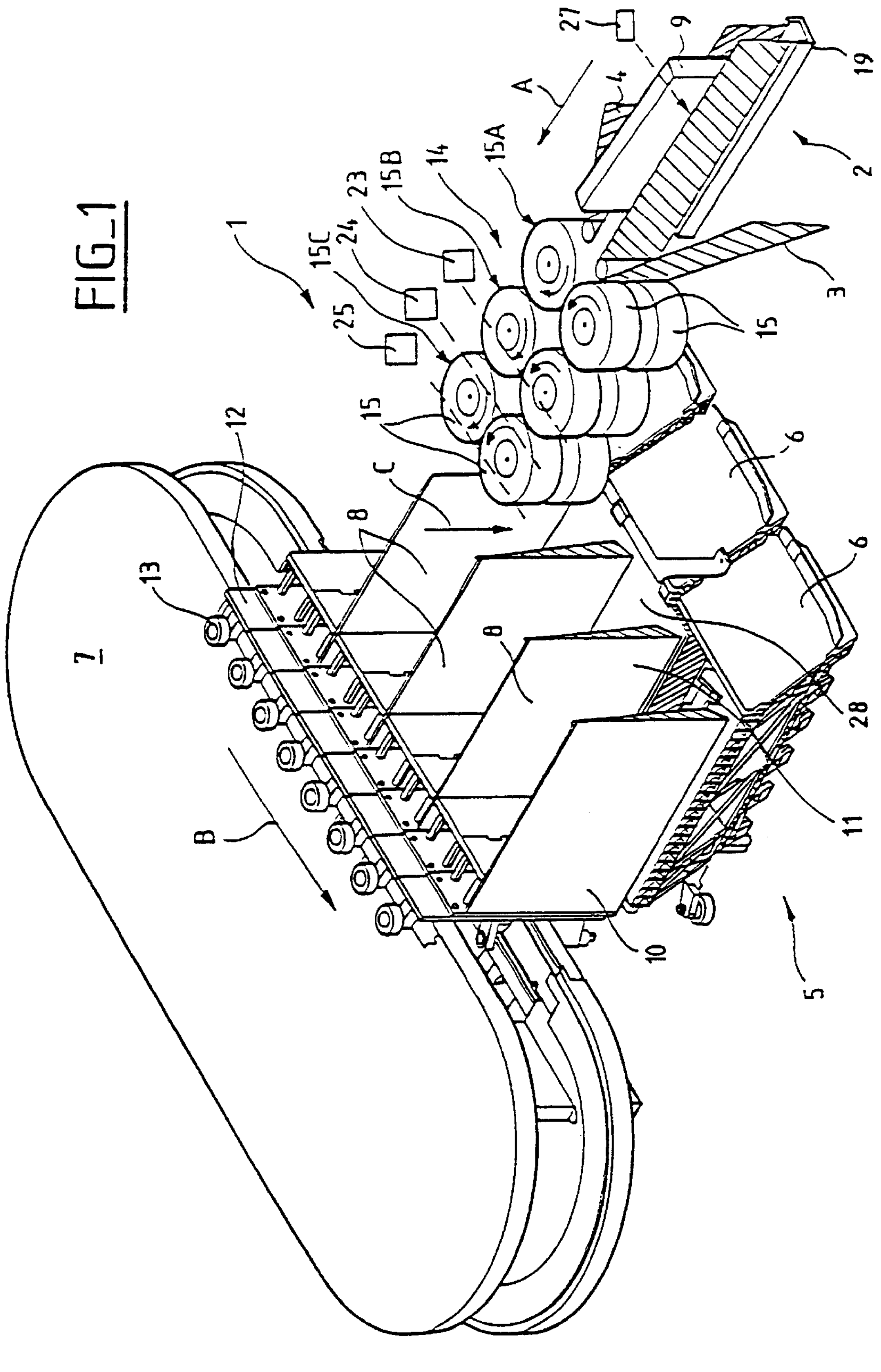
FIG. 1 is a diagrammatic perspective view of a transfer device according to the invention.

In FIG. 1, a device 1 for transferring flat objects is inserted between an entry conveyor 2 with belts 3 and 4 and an exit conveyor 5 with buckets 6.

The transferred flat objects such as 9 are moved, in series and edge-on, between the belts 3 and 4 on the conveyor 2, that is to say in a vertical position in portrait mode, for example, in a horizontal direction shown by the arrow A.

The transfer device 1 comprises an intermediate conveyor 7 which is arranged in the continuation of the conveyor 2 above the bucket conveyor 5. The conveyor 7 consists of several receptacles 8 driven along a horizontal path in a closed loop. Over at least part of their path, the receptacles 8 move in a horizontal direction shown by the arrow B which is perpendicular to the direction A so as to pass across the exit of the entry conveyor.

As visible in FIG. 1, each receptacle 8 consists of two vertical parallel panels such as 10 and 11 defining a groove which is open on the same side as the exterior periphery of the conveyor 7, running perpendicular to the directions A and B. The panels defining the receptacles 8 are fixed to a bracket 12 which constitutes the bottom of the receptacles 8 and which is suspended from a structure 13 with running and guiding rollers on a rail forming part of the conveyor structure 7. The running and guidance structure is coupled to a drive means such as a cable or chain passing over a drive wheel and a return wheel, neither of which wheels are depicted.

The transfer device 1 also comprises an injection system 14 inserted between the exit of the conveyor 2 and the conveyor 7. This injection system consists of motorized elastically deformable elastomer wheels 15, the rotation spindles of which have a fixed position. As visible in FIG. 2, each wheel 15 comprises an elastomer hub 16 and an elastomer tread strip 17 which are connected by elastomer circular-arc-shaped fins 18. The two points of attachment of each fin to the hub and to the tread strip of the elastically deformable wheel are arranged on a radius of the wheel, which makes it possible to obtain a large amplitude of radial deformation of the wheel without any stress concentration zones in the fins.

The elastically deformable motorized wheels 15 of the injection system 14 have their stationary rotation spindles arranged in two rows parallel to the direction A in the continuation of the exit of the entry conveyor 2 as visible in FIG. 1. The wheels 15 in the two rows are arranged in pairs 15A, 15B, 15C, the two wheels of one pair facing each other, so as to grip between them a flat object such as 9 which passes edge-on between the two rows of wheels. As visible in FIGS. 1 and 2, the belts 3 and 4 of the conveyor 2 run alongside a horizontal sole plate 19 fixed to a horizontal mounting plate 20 and along which the flat objects 9 glide, this sole plate 19 also extending between the two rows of motorized wheels 15. The vertical rotation spindles of the wheels 15 of the two rows of wheels of the injection system 14 are fixed by a flange such as 21 to the top of the mounting plate 20 along the two sides of the sole plate 19 and pass through this mounting plate to be coupled to electrical motorization such as 22 fixed to the underside of the mounting plate 20.

Figure 2:
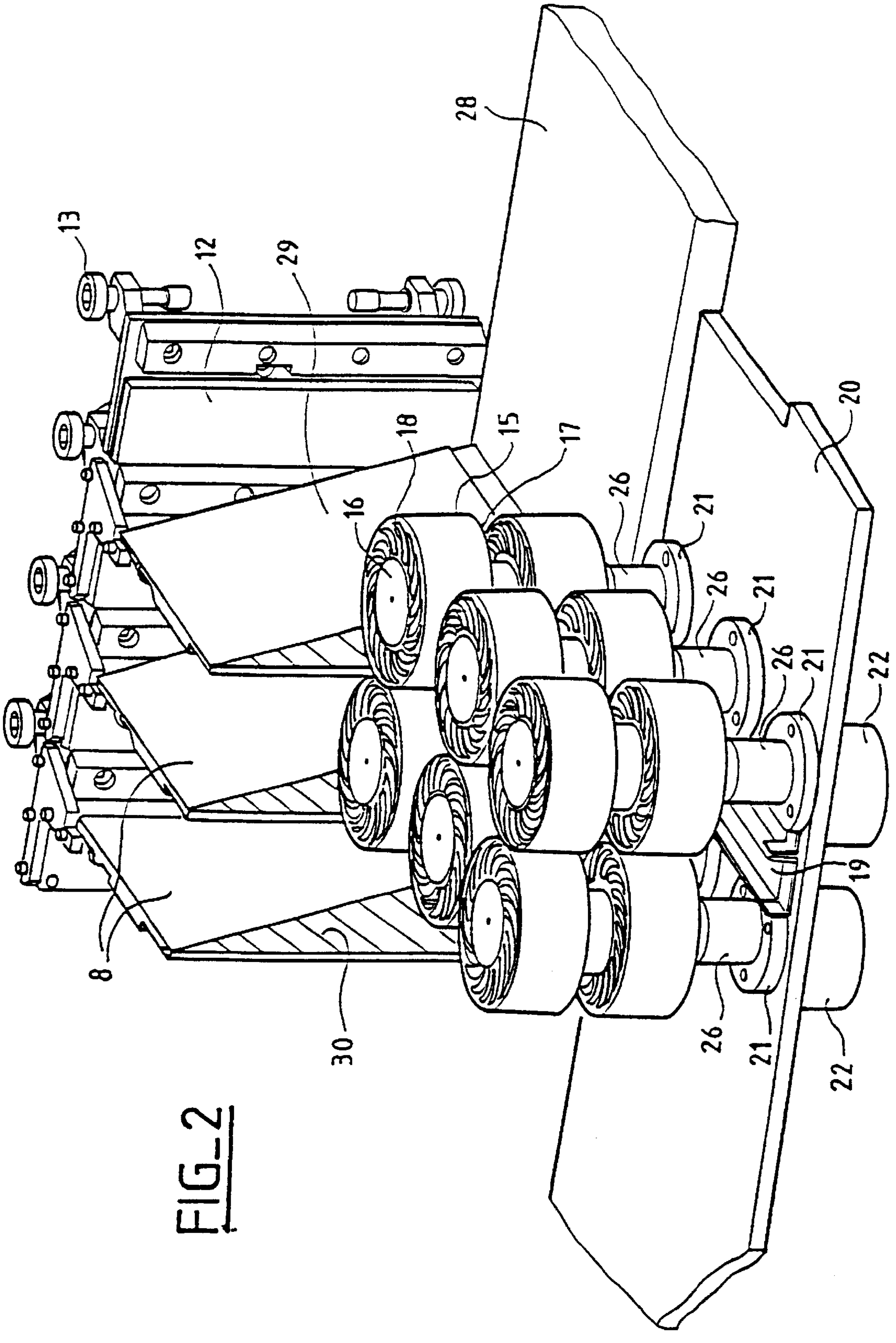
FIG. 2 shows a more detailed perspective view of the transfer device according to the invention.

In the example of FIGS. 1 and 2, each rotation spindle such as 26 carries two twinned wheels spaced vertically apart so that the flat articles 9 can be gripped over a sufficient height so as to keep them correctly edge-on in a vertical position.

In the injection system 14, the wheels 15 of the pairs of wheels 15A and 15B arranged on the same side as the conveyor 2 are rotated at constant speed with the possibility of freely being placed at overspeed whereas the wheels of the pair of wheels 15C, arranged on the same side as the conveyor 7, are rotated at variable speed, making it possible to accelerate the movement of each flat object in the direction A just after it has left the entry conveyor 2 and making it possible to retard the movement of this same object just before it is ejected into a receptacle 8, the bottom of which is in position for intercepting the path of the flat object at a speed lower than the speed at which it travels along the conveyor 2. The violence of the impact of the flat object against the bottom of a receptacle may also be reduced by providing the bottom of a receptacle 8 mounted on a damper.

The length of the two rows of wheels 15 of the injection system 14 in the direction A has to be slightly greater than the greatest length of a flat object in this direction so as to prevent a flat object arriving pinched between variable-speed motorized wheels from still being pinched between the belts of the conveyor 2.

Figure 3:
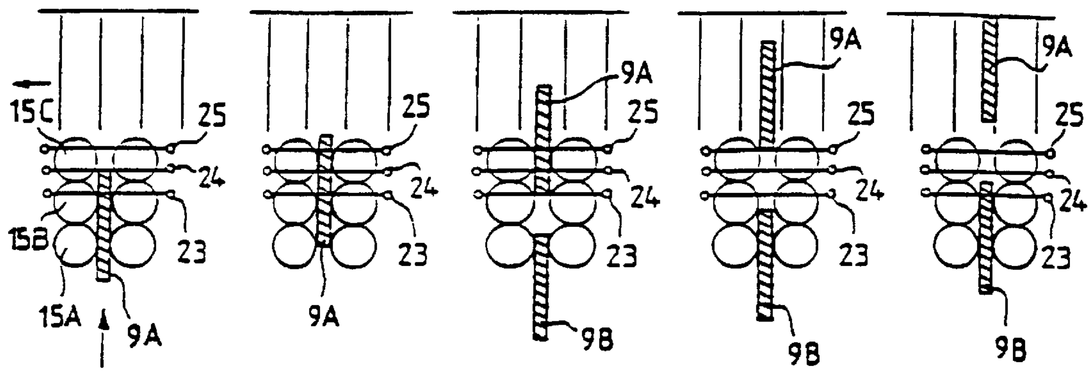
FIGS. 3 and 4 illustrate the principle of regulating the speed of travel of the flat objects between two rows of motorized wheels.

Referring now to FIGS. 1 and 3, a first sensor 24 is placed along the two rows of wheels between the spindle of the wheels of the pair of wheels 15B and the spindle of the wheels of the pair of wheels 15C. A second sensor 23 is placed along the two rows of wheels, upstream of the sensor 24 and approximately downstream of the spindle of the wheels of the pair of wheels 15A in the direction A. Finally, a third sensor 25 is placed along the two rows of wheels, downstream of the sensor 24 and approximately downstream of the spindle of the wheels of the pair of wheels 15C in the direction A. These three sensors are used to detect the passage of the front and rear edge of each flat object past the determined positions indicated hereinabove. These sensors 23, 24, 25 may be of the light-emitting diode type operating by detecting the blocking of a light beam.

Figure 4:
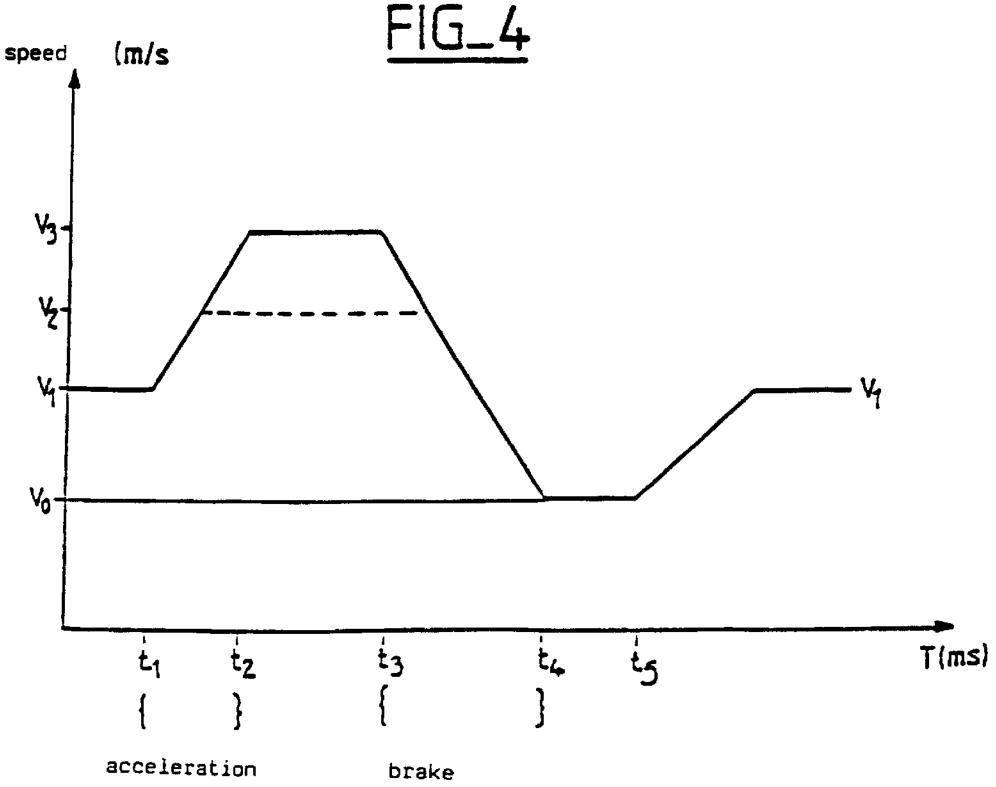

The way in which the injection system speed regulation device works is now described in conjunction with FIGS. 3 and 4.

A first flat object 9A presented at the exit of the conveyor 2 enters between the two rows of wheels at the speed V1 which is the speed at which this object travels in the conveyor 2. The motorized wheels of the pairs of wheels 15A and 15B move it along at the same speed V1 in the direction A.

At the instant t1, the sensor 24 detects the passage of the front edge of the flat object 9A (FIG. 3*a*) before the object 9A engages between the wheels of the pair of wheels 15C. Following this detection, the speed at which the wheels 15C rotate is increased which means the movement of the object 9A is accelerated up to a certain speed higher than V1. As the wheels of the pairs of wheels 15A and 15B can be freely set to overspeed, they do not oppose the acceleration of the movement of the flat object 9A which has already left the conveyor 2.

At the instant t2, the sensor 25 detects the passage of the front edge of the flat object 9A and the acceleration of the movement of this flat object is halted (FIG. 3*b*).

At the instant t3, the sensor 23 detects the passage of the rear edge of the flat object 9A (FIG. 3*c*) and the wheels of the pair of wheels 15C are driven to retard the movement of this object down to a certain speed V0 lower than the speed V1.

At the instant t4, the sensor 24 detects the passage of the rear edge of the flat object 9A (FIG. 3*d*) and the retarding of the movement of this object is halted. The flat object 9A is then ejected by the inertia of the injection system 14 into a receptacle 8 of the conveyor 7 at the speed V0 which is lower than the speed V1.

At the instant t5, the sensor 25 detects the passage of the rear edge of the flat object 9A (FIG. 3*e*) and the wheels of the pair of wheels 15C are driven at the speed V1 so that a new object 98 arriving between the two rows of wheels is taken up as indicated hereinabove.

Depending on the length of the flat object 9A, the maximum acceleration of the movement of the flat object 9A in the injection system is regulated as illustrated by the speed curve in FIG. 4. Thus, for an object with the longest length in the permissible range, this object will be accelerated up to a speed V3 (FIG. 4), whereas another object of shorter length will be accelerated up to an intermediate speed V2 which is lower than V3. The length of a flat object may be determined using a sensor of the light-emitting diode type such as 27, arranged just before the exit of the entry conveyor 2. This sensor is designed to detect the instants at which the front and rear edge of each flat object pass at constant speed, and the length of the object is determined by dividing the speed of travel of the object on the conveyor 2 by the difference between the two instants of detection of the sensor 27. This regulation makes it possible to process a range of flat objects with different lengths in the direction A.

Of course, the movement of the receptacles 8 and the movement of the flat objects 9 on the entry conveyor 2 are synchronized so as to ensure that each flat object is ejected from the injection system 14 into a receptacle 8 in the space of time that separates the passage of the two panels 10 and 11 of a receptacles 8 past the injection system 14.

In the embodiment of the transfer device 14 according to the invention, a flat object 9 is discharged from one receptacle 8 into a bucket 6 only under gravity. The receptacles 8 are moved at constant speed like the buckets 6 and the conveyors 7 and 5 are synchronized in the known way.

As mentioned above, each receptacle 8 of the conveyor 7 is in the form of a groove, the bottom of which is defined by the bracket 12.

A horizontal plate 28 in this instance is mounted in the continuation of the injection system 14 between the conveyor 7 and the conveyor 5. It extends under the grooves 8 of the conveyor 7 in the direction B to support each flat object injected into a groove 8 edge-on as it moves in the direction B before dropping under gravity, at the end of the plate 28, into a bucket 6 located under the groove 8 in vertical alignment.

It will be noted from FIG. 2 that the panels defining the grooves 8 each have a face 29 inclined by about 20° with respect to the vertical and against which each flat object rests as it moves until such time as it is discharged into a bucket 6. Thus, the flat object is discharged into a bucket in this inclined position which corresponds to its position in the bucket.

In addition, the panels defining the grooves 8 each have a vertical outer edge 30 which is tapered towards the inside of the groove to facilitate the introduction of flat objects into the grooves 8.

What is claimed is:

1. A device for individually transferring flat objects (9, 9A) from an entry conveyor (2) on which said objects travel in series edge-on in a first direction (A), into buckets (6) of an exit conveyor (5), the device comprising an intermediate conveyor (7) arranged in the continuation of the entry conveyor above the exit conveyor and equipped with receptacles (8) which, over at least part of their path, can move in a second direction (B) perpendicular to said first direction, each flat object leaving the entry conveyor being injected edge-on into a receptacle of the intermediate conveyor which comes up to face the exit of the entry conveyor so as to be transferred edge-on into a bucket of the exit conveyor, wherein an injection system (14) is disposed at the exit end of the entry conveyor and designed to accelerate and then retard the movement of each flat object in said first direction before injecting it into a receptacle of the intermediate conveyors, said injection system comprising two parallel rows of several elastically deformable elastomer wheels (15) with stationary rotation spindles, between which wheels each flat object is gripped, these two rows of wheels comprising wheels (15A, 15B) arranged on the same side as the entry conveyor and rotated at constant speed with the possibility of being placed freely at overspeed and wheels (15C) arranged on the same side as the intermediate conveyor, which are rotated at variable at variable speed.

2. The device as claimed in claim 1, in which a means (27) is provided for determining the length of each flat object in said first direction and the speed of rotation of the wheels (15C) driven at variable speed is regulated according to said length determination.

3. The device as claimed in one of claim 1, in which each wheel comprises a hub (16) and an annular tread strip (17) made of elastomer which are connected together by elastomer circular-arc-shaped fins (18), the points of attachment of each fin to the hub and to the tread strip of the wheel being aligned on a radius of the wheel.

4. The device as claimed in one of claim 1, in which the receptacles (8) of the intermediate conveyor are grooves which run in a third direction perpendicular to the first and second directions and a flat support (28) is provided in the continuation of the entry conveyor between the intermediate conveyor and the exit conveyor so that a flat object injected into a groove of the intermediate conveyor is kept edge-on and moved along standing on its edge in said second direction as far as one end of said flat support to then fall under gravity into a bucket (6) of the exit conveyor.

* * * * *